3,121,014
CARBOHYDRATE-ENRICHED CHEESE-BASE SURVIVAL-TYPE DEHYDRATED FOOD BAR
Louis Jokay, Evanston, Ill., assignor to the United States of America as represented by the Secretary of the Army
No Drawing. Filed Oct. 24, 1962, Ser. No. 232,911
8 Claims. (Cl. 99—116)
(Granted under Title 35, U.S. Code (1952), sec. 266)

The invention described herein, if patented, may be manufactured and used by or for the Government for governmental purposes, without the payment to me of any royalty thereon.

This invention relates to the production of a dehydrated carbohydrate-enriched cheese-base survival-type food bar. More particularly, the invention relates to a freeze-vacuum dehydrated cheese-base food bar, which is shape-sustaining, can be consumed without rehydration, and contains the basic life-sustaining proteins, fats and carbohydrates in proportion adapted to sustain human life in an emergency without additional foodstuffs.

It has long been recognized that cheese is a valuable component of the human diet, in that it is rich in fat and proteins, and highly taste-acceptable to almost every civilized human being. However, cheese has the following drawbacks: It has a tendency of staling and/or becoming moldy after a relatively short shelf-life, which totally deprives it of its taste-acceptability. Moreover, the low carbohydrate content of cheese is wholly insufficient to sustain human life. Consequently, cheese is usually consumed together with a carbohydrate-rich food component, such as bread, as in the conventional cheese sandwich. However, this combination of bread and cheese is unsuitable for a survival ration, as bread will stale even more quickly than cheese.

With the foregoing principles in mind, I have devised a balanced survival ration, in the form of a dehydrated cheese-base food bar which is enriched by a large proportion of carbohydrates, and produced by a process that yields a palatable balanced food bar, suitable as a survival or other ration for military purposes, as well as for such civilian users as explorers, sailors, hunters, campers and the like.

It is accordingly a principal object of my invention to provide a carbohydrate-enriched dehydrated cheese-flavored food bar, containing proteins, fats and carbohydrates in life-sustaining proportions.

A further object of my invention is a process for producing such a food bar from readily available staple food components, such as fatty cheese, dehydrated potatoes, starch, and shortening, and with food machinery familiar to the food industry.

Another object of my invention is a food bar having a shipping weight much below the weight of a cheese sandwich having comparable protein, fat and carbohydrate contents.

Yet another object of my invention is a food bar having a high degree of taste-acceptability, even to a person under the great stress of survival.

Other objects and advantages will become readily apparent from the following description of a preferred embodiment of my invention and of a preferred method of carrying the same into practice.

A cheese-base dehydrated food bar in accordance with my invention is prepared from the following ingredients:

(1) A fatty cheese. Blue cheese, a popular tasty cheese, is preferred. Other fatty cheeses with well aged flavor, e.g., of the Roquefort, Swiss or aged American type may also be used; they contain more than 25% fat and are thus included in the term "fatty cheese" as used in the specification and claims (in contradistinction to non-fatty cheeses, such as cottage cheese which is not contemplated for use in my invention).

(2) Dehydrated ground potatoes. Preferably, the dehydrated potatoes for use in the invention are produced from cooked diced potatoes that were subjected to a sulfiting and calcium chloride pretreatment before dehydration (to prevent discoloration), and ground after dehydration to a fineness of about U.S. Standard No. 8 to No. 30 sieve size.

(3) Dehydrated water-soluble starch; preferably of the precooked gelatinized, potato starch type.

(4) Fat; e.g. shortening, preferably hydrogenated. Vegetable fats (or mixtures thereof) may be used for shortening in whole or in part.

The foregoing ingredients are compounded in such a way that the final composition has the following nutrient contents:

| | Parts by weight, about |
|---|---|
| Proteins | 7–9 |
| Fats | 13–15 |
| Carbohydrates | 70–75 |

Cheese being the principal protein source for the food bar, it may be necessary to add a small additional amount of soft cheese, such as uncreamed cottage cheese to the preferred formulation about to be described in detail, in order to raise the protein content to the foregoing desired food standards.

*Example*

A food bar containing the foregoing ingredients is preferably compounded as follows, using a food mixer:

About 85 parts of blue cheese are dispersed in an excess of water (about 400 parts) above room temperture (preferably about 140° F.), and about 200 parts of dehydrated precooked ground potatoes are then mixed into this slurry until a smooth paste is produced.

A second batch is prepared by mixing about 30 parts of hydrogenated shortening with an excess of water (about 200 parts), also above room temperature sufficient to melt the shortening (preferably about 140° F.) and about 112 parts by weight of potato starch are blended with this mixture of water and melted shortening, which causes the starch to rehydrate.

This second batch is then combined with the first batch and blended above room temperature (preferably about 140° F.) until a homogeneous mixture is obtained. This mixture is then chilled to a solid pliable mass, without freezing. This mass is molded into bars of the desired size, preferably by pressure molding on a hydraulic press. The size of these bars should be larger than the desired size of the final dehydrated product, as they will shrink during the following dehydration step. Thus, if a dehydrated bar of an area of 90 x 46 mm. is desired, the press mold should have an internal dimension of about 95 x 51 mm. Similarly, the thickness of the molded (undehydrated) bar should be about 5 to 10% in excess of the desired final thickness; thus, if the final thickness is intended to be 14 mm., the bars should be initially molded to a thickness of about 15–15.5 mm.

The molded bars are then freeze-vacuum dehydrated, by following techniques, summarized below.

The bars are frozen to about −15 to about −20° F., and vacuum-dehydrated in a chamber equipped for obtaining and holding a very low absolute pressure (high vacuum). The chamber should be equipped with shelves which can be heated or cooled by means of a circulating liquid medium. The drying chamber should be thoroughly cleaned and free of all traces of foreign odors coming from a disinfectant, a washing solution, or from products previously dried. The shelves should preferably be chilled, using ice water or other refrigerant before and during loading and while the vacuum is being drawn on the oven. However, if cooling of the shelves is impossible, the frozen trays should be kept frozen and as cold as possible before loading the oven. To avoid thawing of any portion of the frozen cheese bars while they are being transferred to the dryer, arrangements should be made to accomplish the transfer quickly and to draw a vacuum of 1.5 mm. or lower in not to exceed about 8 minutes after completion of the transfer. About 30 minutes after reaching 1.5 mm. absolute pressure or less (preferably 600–800 microns), heat is applied to the circulating medium. The final temperature of the circulating medium should be about 110° F. This temperature should be reached in about 4 hours or more. The rate of heating should be so regulated that the plate temperature, for the first two hours should be about 50° F., and about 90° F. for the next two-hour period. The absolute pressure in the drying chamber at no time should exceed 1,500 microns (preferably 750 microns). When these conditions have been established, they are to be maintained throughout the drying process, or until the product contains not more than about 4% moisture, preferably 2–2.5%.

A typical bar, prepared as above, contains about 7 parts proteins, 14 parts fats, 72 parts carbohydrates, 4 parts ash, 1 part salt, and 2 parts moisture, per 100 parts by weight.

The carbohydrate source in the foregoing example is a mixture of dehydrated ground potatoes and potato starch. It is possible to vary the proportions of these two carbohydrate sources within wide limits, provided that the amount of the other is adequately increased to provide the desired carbohydrate content of the final product. For reasons of taste-acceptability, I recommend that the amount of dehydrated ground potatoes be substantially in excess of the amount of potato starch; also, the potatoes contain some proteins, which is desirable for the purposes of the invention. On the other hand, I recommend (although this is not absolutely necessary for the practice of the invention) that some of the carbohydrates be supplied in the form of dehydrated starch, as this is a concentrated source of carbohydrate and thus facilitates the attainment of the desired carbohydrate level in the final product, without adding too great a proportion of non-cheese material to the composition.

It will thus be seen that I have provided highly concentrated palatable dehydrated cheese-base food bars, which contain all the necessary building blocks of life to sustain a person for a period of several days, even if he is cut off from other food sources. It is not necessary to rehydrate the food bars. However, the body needs for water must of course be supplied from other sources. The ratio of the combined weight of proteins, fats and carbohydrates of the food bar to the total weight of the bar (including residual moisture) should be high, preferably 93% or more (per 100% of bar weight, including its moisture content).

The bars, when properly wrapped and sealed (preferably heat-sealed under vacuum conditions or in an atmosphere of low oxygen content) in conventional wrapping material suitable for cheese foods, such as polyethylene terephthalate sheeting or pouches, will have a shelf-life of many months, without losing their taste-acceptability.

It will be understood, of course, that the foregoing example of the practice of my invention is for illustrative purposes and that the detailed instructions as to proportioning of ingredients and manipulative procedures may be varied within the skill of the expert in the art of food technology. These and other variations which will readily occur to the expert are thus included within the spirit and scope of my invention and subjoined claims.

I claim:

1. Process of making a carbohydrate-enriched cheese-base dehydrated food bar, comprising dispersing above room temperature a fatty cheese in an excess of water to form a slurry; adding dehydrated precooked ground potatoes to said slurry to form a paste, adding above room temperature to said paste a mixture of melted fat, water and of starch rehydrated in said last-named water, blending all components until a homogeneous mixture is formed; chilling said last-named mixture to a solid pliable mass; shaping said mass into bar form; and freeze-vacuum dehydrating said bar to a moisture content not exceeding about 4%; whereby a storage-stable cheese-flavored palatable food bar containing proteins, fat and carbohydrates in proportions is produced.

2. Process according to claim 1, wherein said added fat is hydrogenated shortening.

3. Process of making a carbohydrate-enriched cheese-base dehydrated food bar, comprising dispersing above room temperature a fatty cheese in an excess of water to form a slurry; adding dehydrated precooked ground potatoes to said slurry to form a paste, adding above room temperature to said paste a mixture of melted hydrogenated shortening, water and of potato starch rehydrated in said last-named water, blending all components until a homogeneous mixture is formed; chilling said last-named mixture to a solid pliable mass; shaping said mass into bar form; and freeze-vacuum dehydrating said bar to a moisture content not exceeding about 2.5%; whereby a storage-stable cheese-flavored palatable food bar containing proteins, fat and carbohydrates in proportions is produced.

4. Process according to claim 1, where said cheese is blue cheese.

5. Process according to claim 1, wherein said food bar contains, per 100 parts by weight:

| | Parts by weight, about |
|---|---|
| Proteins | 7–9 |
| Fat | 13–15 |
| Carbohydrates | 70–75 |

6. Process according to claim 5, wherein said food bar contains a total of at least about 93 parts by weight of proteins, fat and carbohydrates, and not more than about 2.5 parts by weight of moisture.

7. A dehydrated cheese-flavored palatable carbohydrate-rich homogeneous food bar produced by the process of claim 5.

8. A dehydrated cheese-flavored palatable carbohydrate-rich homogeneous food bar produced by the process of claim 6.

References Cited in the file of this patent

UNITED STATES PATENTS 3,056,681 Rogers _____ Oct. 2, 1962